United States Patent
Chan et al.

(10) Patent No.: US 10,411,893 B2
(45) Date of Patent: Sep. 10, 2019

(54) TOKEN KEY INFRASTRUCTURE AND METHOD

(71) Applicant: Kam Fu Chan, Tsuen Wan, Hong Kong (CN)

(72) Inventors: Kam Fu Chan, Hong Kong (CN); Bean Lee, Hong Kong (CN)

(73) Assignee: Kam Fu Chan, Tsuen Wan (HK)

( * ) Notice: Subject to any disclaimer, the term of this patent is extended or adjusted under 35 U.S.C. 154(b) by 67 days.

(21) Appl. No.: 15/129,079

(22) PCT Filed: Mar. 20, 2015

(86) PCT No.: PCT/IB2015/052063
§ 371 (c)(1),
(2) Date: Sep. 26, 2016

(87) PCT Pub. No.: WO2015/145319
PCT Pub. Date: Oct. 1, 2015

(65) Prior Publication Data
US 2017/0170962 A1     Jun. 15, 2017

(30) Foreign Application Priority Data
Mar. 27, 2014   (WO) .................. PCT/IB2014/060231

(51) Int. Cl.
| | | |
|---|---|---|
| *H04K 1/00* | (2006.01) | |
| *H04L 9/00* | (2006.01) | |
| *H04L 9/08* | (2006.01) | |
| *H04L 9/32* | (2006.01) | |
| *G06F 21/12* | (2013.01) | |
| *G06F 21/60* | (2013.01) | |
| *H04L 29/08* | (2006.01) | |
| *H04L 9/14* | (2006.01) | |
| *H04L 9/30* | (2006.01) | |
| *H04L 29/06* | (2006.01) | |

(52) U.S. Cl.
CPC .............. *H04L 9/32* (2013.01); *G06F 21/125* (2013.01); *G06F 21/606* (2013.01); *H04L 9/006* (2013.01); *H04L 9/0891* (2013.01); *H04L 9/14* (2013.01); *H04L 9/3026* (2013.01); *H04L 63/0428* (2013.01); *H04L 63/06* (2013.01); *H04L 67/10* (2013.01)

(58) Field of Classification Search
CPC ....... H04L 9/32; H04L 63/06; H04L 63/0428; H04L 9/3026; H04L 9/006; H04L 9/14; H04L 67/10; H04L 9/0891; G06F 21/606; G06F 21/125
USPC ........... 713/168; 380/255, 262, 279, 281, 44
See application file for complete search history.

(56) References Cited

U.S. PATENT DOCUMENTS

| | | | | |
|---|---|---|---|---|
| 8,312,064 | B1* | 11/2012 | Gauvin | G06F 21/6218 707/822 |
| 2003/0149878 | A1 | 8/2003 | Perkins | |
| 2006/0269063 | A1* | 11/2006 | Hauge | G06F 21/10 380/262 |
| 2010/0017624 | A1* | 1/2010 | Chan | G06F 21/125 713/190 |
| 2010/0211787 | A1* | 8/2010 | Bukshpun | H04L 9/0838 713/170 |
| 2011/0010548 | A1* | 1/2011 | Stewart | H04L 63/0428 713/170 |
| 2013/0124874 | A1* | 5/2013 | Kudelski | G06F 21/70 713/189 |
| 2013/0297801 | A1* | 11/2013 | Guest | H04L 47/827 709/226 |
| 2014/0157386 | A1* | 6/2014 | Tanaka | H04L 63/0428 726/7 |
| 2014/0337941 | A1* | 11/2014 | Kominar | G06F 21/45 726/6 |
| 2015/0110273 | A1* | 4/2015 | Ponceleon | H04L 9/0816 380/277 |
| 2015/0131796 | A1* | 5/2015 | Milsted | G09C 5/00 380/44 |

FOREIGN PATENT DOCUMENTS

| | | |
|---|---|---|
| CN | 1604534 A | 4/2005 |
| CN | 101141680 A | 3/2008 |
| CN | 102325320 A | 1/2012 |
| WO | WO 2008/035141 A2 | 3/2008 |

OTHER PUBLICATIONS

International Search Report (PCT/ISA/210) dated Aug. 12, 2015, by the State Intellectual Property Office of the P.R. China Patent Office as the International Searching Authority for International Application No. PCT/IB2015/052063.
Written Opinion (PCT/ISA/237) dated Aug. 12, 2015, by the State Intellectual Property Office of the P.R. China Patent Office as the International Searching Authority for International Application No. PCT/IB2015/052063.

* cited by examiner

*Primary Examiner* — Aravind K Moorthy
(74) *Attorney, Agent, or Firm* — Buchanan Ingersoll & Rooney PC

(57) ABSTRACT

A Token Key Infrastructure and a method using Polymorphic Executable or its variants for the exchange of digital information, including digital data and digital executable codes, over network or internet in a secure way with the use of Dynamism, Polymorphism and Dynamic Polymorphism, as well as integrating with Public Key Infrastructure where considered appropriate for the protection of intellectual property rights, privacy and confidentiality of digital information.

16 Claims, No Drawings

TOKEN KEY INFRASTRUCTURE AND METHOD

TECHNICAL FIELD

This invention relates to the protection of intellectual property, expressed in the form of digital information, including digital data as well executable code for use in device(s), including computer system(s) or computer-controlled device(s) or operating-system-controlled device(s) or system(s) that is/are capable of running executable code or using digital data. Such device(s) is/are mentioned hereafter as Device(s).

In particular, this invention relates to the infrastructure, system, method and application of processing, distribution and use in Device(s) of digital information, including digital data as well as executable code, such as boot code, programs, applications, device drivers, or a collection of such executables constituting an operating system in the form of executable code embedded or stored into hardware, such as embedded or stored in all types of storage medium, including read-only or rewriteable or volatile or non-volatile storage medium (referred hereafter as the Storage Medium) such as physical memory or internal DRAM (Dynamic Random Access Memory) or hard disk or solid state flash disk or ROM (Read Only Memory), or read-only or rewriteable CD/DVD/HD-DVD/Blu-Ray DVD or hardware chip or chipset etc.

In essence, this invention reveals the infrastructure, system, method and application that could be used to make Dynamism, Polymorphism and Dynamic Polymorphism Over Cloud possible for the delivery of digital information. In this relation, it makes possible the processing, distribution and use of digital information in Device(s) connected over local clouds or internet clouds for the purpose of protecting intellectual property.

However, the infrastructure, system, method and application revealed in this invention is not limited to delivery or exchange of digital information over clouds, i.e. local area network or internet, but could be used in other modes of delivery or exchange of information. Implemented in the best scenario, the same piece of information will never be delivered in the same face, making internet tapping and hacking for obtaining information a futile exercise.

BACKGROUND ART

Patent Cooperation Treaty (PCT) International Application No. PCT/IB2006/053395, entitled "FROM POLYMORPHIC EXECUTABLE TO POLYMORPHIC OPERATING SYSTEM", describes a method for the creation, distribution and execution of polymorphic executable or its variants for the purpose of protecting executable codes.

Executable code is in fact a piece or an expression type of digital information. Protection of intellectual property for digital information, including executable code and digital data (i.e. digital non-executable information), is essential for innovation and the advance of society based on intellectual activities. The aforesaid PCT application describes how other preceding efforts or methods, including the use of checking for correct password, checking for encrypted digital key file, checking for signature provided in hardware, checking for correct password through activation procedure over internet, etc. designed for protecting the value of intellectual activities represented in software programs or executable code are either easily bypassed or require the deployment of specially designed hardware. Such efforts or methods therefore are either simply ineffective or involve additional hardware costs or are not suited to general-purpose computing or processing environment.

The aforesaid PCT application demonstrates how software programs or executable code can be represented in polymorphic forms that are different and yet runnable in different authenticated or authorized states, but un-runnable (for the features contained in the Polymorphic Code Section) in unauthenticated or unauthorized states in a general-purpose computing or processing environment so that intellectual property contained in such software programs or executable code can be best protected. It discloses the method of using uniquely identifiable information, such as a serial number or its derivative, retrieved from hardware or other ways as a key for encryption/decryption of software programs or executable code with hardly breakable or unbreakable algorithm. This can be a solution safeguarding such intellectual activities against those simple and yet effective pirating activities involving copying and simple hacking. Using the method thus disclosed, when used for digital data, the digital data concerned could only be restored and used specific to the Device for which the digital data is designated or encrypted with the specific identifying key derived uniquely from the Device. That means the same piece of digital data is represented differently and uniquely in a polymorphic way (i.e., Polymorphic Digital Data) specific to different Device(s) with different unique identifying keys.

DISCLOSURE OF INVENTION

Technical Problem

The advance of Cloud Computing and the provision of Cloud Services however present another technical problem to be solved even if Polymorphic Executables are used. This general technical problem, simply put, is about how to protect digital information, including digital data and digital executable codes from being tapped on its way from local computers through local area network and its gateways out to the internet cloud platforms. Such tapped digital information, including digital data and digital executable codes, could therefore be re-used time and again, especially in simulated virtual machines or Devices. However, not only the protection of Intellectual Property Rights is called into question, Privacy and Confidentiality of the general mass are seriously and irreparably trampled upon when exchange of information and messages or contents in digital form has become a daily phenomenon for the general public with digital computing devices gaining access to internet, through email systems or online message messenger services or other similar services made available to the public, including banking services. Internet tapping of digital information becomes a menace to everybody with the coming of super speed computers.

Cloud Services are usually charged on the basis of usage of time, session, network traffic volume, number of requests or access, etc. So the same digital information, including digital data and digital executable codes, are very often sent over the internet network in different directions many times. The traditional way of selling digital information, including digital data and digital executable codes, on one-off basis is not suited to the new model of Cloud Services provision.

Polymorphic Executable limits its usage to one unique computer or machine or Device. But once it is licensed and provided to the buyer, software makers could not easily charge it for the second time, if the buyer does not observe the terms and conditions of using it the first time, without resorting to legal actions. The provision of music files or video movies faces the same problem. In order to provide such digital information over the internet employing Cloud Services, a new technical solution has to be invented.

Digital information with privacy and confidentiality concerns other than intellectual property rights has also to be protected in the same way. The present invention below provides a technical blueprint and solution to the protection of digital information against network or internet tapping, including digital data and digital codes for safe-guarding privacy, confidentiality and intellectual property rights.

Solution to Problem

Technical Solution

To guard against internet tapping, the solution of providing the digital information in a polymorphic way as revealed by the aforesaid. PCT Application, PCT/IB2006/053395, is not sufficient. It has to be supplemented by providing the digital information in a dynamic way. Using this solution as revealed in the present invention below, the same digital information passing through the internet from the Cloud Server to the individual client computers does not appear in the same face or same form; i.e. the same digital information is not always in the same sequence of 0s and 1s, instead it has numerous such sequences. In other words, the same digital information passing through the internet from the Cloud Server to the individual client computers differs from computer to computer as well as from time to time even for the same client computer.

Dynamic provision of digital information could be used alone to defy internet tapping. Dynamism is achieved when the same piece of digital information appears in different faces at different times. This could be achieved using variable, in random or otherwise, identifying keys for the encryption/decryption process.

However, to strengthen the protection, this could be done by tying the digital information to a particular Device; the digital information is encrypted using the unique hardware identifying key or signature of the particular Device under concerned. The tying could be bound to other identifying features as well. And to further strengthen the protection or tying, one may choose to use more keys, such as biometric keys, such as finger prints, eye prints, etc. to include more types of identifiers of different nature. Such different types of keys could be used in separate rounds of encryption or put into different groupings or combinations and used in different rounds of encryption. This is how Polymorphism is done; i.e. the same piece of digital information is represented in different faces according to the different and yet unique identifying keys or signature of different identifying features.

Combining Dynamism with Polymorphism yields Dynamic Polymorphism in which the same digital information varies from Devices to Devices (or other identifying features singly or in combination) and from time to time even for the same Device (or other identifying features singly or in combination). In this way, the digital information is either encrypted firstly using the Device hardware (or other identifying features singly or in combination) identifying key and then using a variable key, such as a random code or otherwise, in the second round of encryption or encrypted using a key made up partly of the Device hardware (or other identifying features singly or in combination) identifying key and partly of a variable key.

To further strengthen the protection, one may design or employ different encryption/decryption algorithms, including different PKI or symmetric algorithms, in the aforesaid steps in different combinations. It is acknowledged that secure and hard-to-break encryption/decryption algorithms are hard to derive. So it is understandable that the number of algorithms that could be practically used are far less than the choice of different types and numbers of identifying keys.

So Dynamism, Polymorphism and Dynamic Polymorphism employing the techniques described above is the way to strength protection of intellectual property rights, privacy and confidentiality in the present Internet Era against network tapping by agents or agencies employing fast running super computers for cracking.

To achieve Dynamism, Polymorphism and Dynamic Polymorphism for the protection of digital information against network or internet tapping, the key is the key; i.e. how the key for the encryption/decryption process could be protected or conveyed amongst parties engaged in the process of exchange of digital information, including the Sender, the Conveying Server(s) (CS) in between and the Receiver. Of course, the strength of the encryption/decryption algorithms used is also crucial, but how to design an unbreakable encryption/decryption algorithms lies beyond the scope of present invention.

So how to protect the encryption/decryption key against internet tapping is the key of the present invention in addition to what is described above.

An obvious way is not to pass the encryption/decryption key in digital form through the network or internet. So, for instance, one can meet face to face and pass the encryption/decryption key through concealed hand gestures. But with the frequent exchange of digital information over different parts of the world over great distance, one cannot do so if one has to frequently exchange such encryption/decryption keys for different pieces of messages or contents to be conveyed. Using only one key for all messages or contents is not Dynamism and the messages or contents so conveyed could easily be cracked.

The present invention, however, does not preclude the use of the method of conveying the encryption/decryption key (or the Token Key or the Key Reference Table or Information necessary for generating Key Reference Table as described later in the present invention) as mentioned in the last paragraph or other concealed ways, that are assumed to be unbreakable or undiscoverable, such as passing and using an USB thumb drive containing the encryption/decryption key in digital form or passing the encryption/decryption key over voice using mobile phones separately. One could use such methods for conveying the Ultimate Key. The Ultimate Key is defined here as the key used for encrypting or decrypting the first Key Reference Table (KRT). KRT is defined here as a series of 0s and is of a length that a Token Key (TK) could be converted or turned into a Real Key (RK) by checking and referring to this series of 0s and 1s. The length of the KRT and how its series of 0s and 1s are sequenced, whether at random or otherwise, is to be determined by the owner of the KRT commensurate with the security requirements the owner wishes to have or by the application designer or owner in control of the application that is responsible for the exchange of the digital information.

So the present invention is different from the Public Key Infrastructure (PKI) in the sense that the key used in PKI is a public key that is associated with a particular asymmetric encryption/decryption algorithm and that the key used in the present invention is a Token Key that is to be passed over the network or internet in digital form, when used with its associated KRT, its corresponding Real Key could be ascertained and obtained for use in the encryption/decryption process. The present invention therefore reveals a Token Key Infrastructure (TKI). The TKI could be used together with PKI in the actual implementation without conflict; i.e. the TK and the KRT could be delivered using the PKI framework; and the Public Key as well as the Private Key of the PKI framework, if found desirable, could be delivered using the TKI framework.

By using TKI, keys can be passed over network or internet in a masquerade way that facilitates the use of Dynamism, Polymorphism and Dynamic Polymorphism mentioned above. If the same message or piece of digital information could be represented (i.e. encrypted using the Real Key) in numerous different ways according to varying random keys (Dynamic Real Keys), unique but different keys specific to different types of identifying features (Polymorphic Real Keys), and the aforesaid keys in different ways of combination at different time by different parties (Dynamic Polymorphic Real Keys) using different encryption/decryption algorithms for the exchange of digital information over network or internet, then it understandably greatly heightens the impossibility for any agents or agencies trying to decipher, as much as possible if not all, the digital information passed over the network or internet. Also the Public Key and the Private Key under the Public Key Infrastructure could also be used as the Real Key for encryption/decryption and represented in the form of a Token Key for masquerade and sending over network or internet. Dynamic Key, Polymorphic Key, Dynamic Polymorphic Key, Private Key and Public Key could also be combined together in different combinations to form a Real Key and represented in the form of a Token Key for use. The Token Key so sent could be converted into a Real Key by the Receiver and the Receiver could separate out the combined key into different Real Keys for their respective encrypting or decrypting purposes. In that case, for example, the digital information so sent could be encrypted more than one time, such as using a Dynamic Key with a symmetric algorithm for encryption first and then using a Public Key with an asymmetric algorithm for encryption for a second time. If the Receiver does not have the corresponding Private Key embedded in the Receiver Application (RA), the Sender could send a Token Key to the Receiver, after being converted into a Real Key, the Real Key consists of a Dynamic Key and a Private Key for decrypting the two layers of encryption of the digital information so received by the Receiver. So in this way, the Public Key Infrastructure could be integrated into the Token Key Infrastructure, as revealed in the present invention. In another way of integration of PKI with TKI as revealed earlier, the Token Key could also be encrypted using the Public Key and decrypted using the Private Key by the Sender Application (SA) and the RA, which are embedded with the Public Key and the Private Key together with the corresponding asymmetric algorithm for encryption and decryption. The above description represents just some ways of integrating the PKI with TKI and such integration could be done in other conceivable ways as well. One of the characterizing feature of the present invention is the integration of PKI with TKI by way of the above illustration.

So all parties concerned in the exchange of digital information could employ their own TKs and KRTs, including the Sender, the Conveying Server(s) in between if any and the Receiver. So the following are the possible scenarios of using TKs and KRTs under the TKI: (1) only the Sender Token Key(s) (STK) and Sender Key Reference Tablets) (SKRT) or Information necessary for generating SKRT (ISKRT) are used throughout the exchange of digital information; (2) only the Receiver Token Key(s) (RTK) and Receiver Key Reference Table(s) (RKRT) or Information necessary for generating RKRT (IRKRT) are used throughout the exchange of digital information; (3) both STK and SKRT or ISKRT as well as RTK and RKRT or IRKRT are used in the exchange of digital information; (4) only Conveying Server Token Key(s) (CSTK) and Conveying Server Key Reference Table(s) (CSKRT) or Information necessary for generating CSKRT (ICSKRT) of one Conveying Server are used throughout the exchange of digital information; (5) CSTK and CSKRT or ICSKRT of more than one Conveying Server are used in the exchange of digital information; (6) is (1) plus (4); (7) is (1) plus (5); (8) is (2) plus (4); (9) is (2) plus (5); (10) is (3) plus (4); and (11) is (3) plus (5).

There can also be Exchange Server(s), which only sends out digital information so received, without performing the role of Conveying Server(s), which adds another layer of encryption to the digital information received and to be sent out.

Advantageous Effects of Invention

Advantageous Effects

By using TKI, i.e. integrating with the use of TK and KRT or Information necessary for generating KRT (IKRT), Dynamism, Polymorphism and Dynamic Polymorphism could easily be implemented for passing digital information over network or internet, making internet tapping extremely difficult and ineffective if not impossible. Using Dynamism, TK and KRT or IKRT together, digital information could be passed over network or internet with a new level of security and its privacy and confidentiality are strengthened. Using Polymorphism, TK and KRT or IKRT together, the identifying keys specific to Devices (or other identifying features) could be easily sent over network or internet in the form of TK more safely and conveniently. The integrity, intellectual property rights and values of Polymorphic Executables and Polymorphic Data could be further enhanced by combining with the use of Dynamism under TKI, providing a feasible cloud sales model for selling and distributing digital information over network cloud or internet cloud.

BRIEF DESCRIPTION OF DRAWINGS

Description of Drawings

BEST MODE FOR CARRYING OUT THE INVENTION

Best Mode

The assumption of the present invention for protecting digital information is that the agents or agencies or hackers or crackers are not God. They do not possess omniscient power. They could not break into every house; they could not plant whatever eavesdropping programs into every computer; and what they could do at most is to sit on the internet gateways and tap all the digital information that passes along. If they could be God to one person; i.e. they could break into one's house and plant eavesdropping programs into one's computer and sit on the internet gateways to tap one's information, they could not do this to everyone in the world. If so, just sitting on and controlling the internet gateways and tapping digital information passing along is not enough to decipher the digital information exchanged over internet when such information is passed along using the TKI infrastructure.

For ease of understanding the TKI revealed in the present invention, Scenario (3) mentioned above is further elaborated, i.e. where both the Sender Token Key(s) (STK) and Sender Key Reference Table(s) (SKRT) or Information necessary for generating SKRT (ISKRT) as well as the Receiver Token Key(s) (RTK) and Receiver Key Reference Table(s) (RKIO) or Information necessary for generating RKRT (IRKRT) are used in the exchange of digital information, in the following description, the exchange of message(s) is revealed in a very simple way that is pertinent to the essence of the present invention only.

Usually exchange of digital information is a Two Way Traffic, so the Sender is also the Receiver and the Receiver the Sender. And the exchange of digital information includes the messages) or content(s) intended to be exchanged and the steps in preparation for (i.e. the initialization steps) and the steps for actual sending of the message(s) or content(s). The initialization steps once completed, one message or more than one message could be exchanged using the preparation so established. If it is found desirable, the initialization steps could be re-run to make another preparation for the subsequent or renewed exchange of message(s). This may be the case for every exchange session or when one feels the integrity and security of the message(s) being exchanged is being compromised.

Under TKI, typically the initialization steps begin when the Sender wishes to establish the contact for sending message(s) or content(s) to the Receiver. If it is not the first contact, the Sender Application (SA) relies on the previous preparation established by the previous initialization steps. If it is the first contact, the initialization phase begins. It is assumed that both the SA and Receiver Application (RA) are alive or staying online. So after making the handshaking connection, the SA generates and sends out the first STK and the first SKRT to the Receiver. The SA actually derives the first STK from the first Sender Real Key (SRK) by making reference to the first SKRT. After receiving the first STK and the first SKRT, by making reference from the first SKRT, the Receiver could obtain the first SRK. The first SKRT is a KRT as described earlier, consisting of a sequence of 0s and is, which is good to work as a reference table for the conversion of RK to TK or vice versa. RK and TK could be in their identifiable format respectively. The SKRT could be generated by the SA or supplied by the Sender, i.e. the user using the SA. The generation of Key Reference Table will be further elaborated later in this invention.

To integrate the TKI framework with the PKI framework, the first STK and the first SKRT could be sent using PKI framework separately as two separate pieces of sending or in one go in a chosen format so that the two pieces of digital information could be separated out accurately afterwards. The relevant PKI algorithm and the related private and public keys could be embedded in the SA and RA. The SA and RA could also be a normal or Polymorphic Executable.

The first SRK could also be a hardware identifying key unique and specific to the Device of the Sender or other identifying features in single or in combination. Or the first SRK could just be a key of random value or chosen otherwise. After checking and making reference to the first SKRT, the SA converts the first SRK to the first STK and sends the latter to the Receiver together with the first SKRT. As mentioned in the last paragraph, the first STK and the first SKRT could be sent using PKI algorithm and the related public and private keys, which are embedded in SA and RA.

In this way the digital information constituting the first STK and the first SKRT is secured.

The encryption of the first STK and the first SKRT (as two separate pieces of sending or as one piece in a chosen format for sending) could also be done using not. PKI framework but symmetric encryption/decryption algorithm using the Ultimate Key for encryption as mentioned above and the Ultimate Key be sent through face to face contact or other secure ways.

The first SRK or its corresponding STK could be a key of random value or a variable chosen otherwise. Or it could be a unique key specific to the hardware of the Device in which the SA runs or specific to other identifying feature(s) of the Sender. Or it could be both the aforesaid ways in combination.

After receiving the first STK, the RA makes reference to the first SKRT to obtain the first SRK, the first SRK could therefore be used as for encrypting/decrypting, where appropriate, the second STK and SKRT sent from the Sender.

The designer for the SA and RA, for the sake of simplicity of implementation, may not opt for sending the second set of STK and SKRT for use. Using more sets of STK and SKRT means higher complexity in implementation but also greater difficulty for the tapper to crack.

In the simplest way, the first set of STK and SKRT may be considered sufficient for the protection of the sending of the first and the subsequent messages or contents and their corresponding STKs. To achieve Dynamism, each message or content or each group of messages or contents could be associated with one corresponding STK and the associated SRK that could be derived from the corresponding SKRT. In this case where only the first SKRT is used, this corresponding SKRT is just the first SKRT.

In the Scenario (3) being described, the RA will do the same what the SA is doing up to now. That is generating the first RTK and the first RKRT and sending them to the SA like what is described above. The STK, SKRT, RTK and RKRT could also be generated by some generating server(s) connected over network or internet from which the SA and RA could obtain such keys and tables for use, subject to security and other design considerations.

After the above initialization phase by the SA and the RA, the SA has its own SKRT, STK and SRK, and has sent SKRT and STK to the RA and the RA has its own RKRT, RTK and RRK and has sent RKRT and RTK to the SA. So the SA also has RKRT and RTK from the RA and then derives RRK from RTK by making reference to RKRT; and the RA likewise has SKRT and STK from the SA and derives SRK from STK by making reference to SKRT. In short, both the SA and RA have 1 set of SKRT, STK and SRK and 1 set of RKRT, RTK and RRK.

By way of illustration, to send the first Sender Message, the SA could first use the SRK to encrypt it and then encrypt this SRK-encrypted message further using the RRK with the corresponding symmetrical algorithm(s) (embedded in both SA and RA) and then send it to the RA, whether further through using PKI (embedded in both SA and RA) or not.

After receiving the first encrypted Sender Message, to get the first Sender Message the RA decrypts it using the corresponding symmetrical algorithm(s) and the corresponding RRK and then the SRK (if the encrypted message has been sent using PKI, the encrypted message has to be decrypted by the RA using the corresponding PKI first before the RA does the aforesaid decryption using the aforesaid corresponding symmetrical algorithm(s) and keys).

If the RA wants to reply a message, the first Receiver Message to the SA, it uses the RRK to encrypt it and then encrypts this RRK-encrypted message further using the SRK with the corresponding symmetrical algorithm(s) (embedded in both SA and RA) and then send it to the SA, whether further through using PKI (embedded in both SA and RA) or not.

After receiving the first encrypted Receiver Message, to get the first Receiver Message the SA decrypts it using the corresponding symmetrical algorithm(s) and the corresponding SRK and then the RRK (if the encrypted message has been sent using PKI, the encrypted message has to be decrypted by the SA using the corresponding PKI first before the SA does the aforesaid decryption using the aforesaid corresponding symmetrical algorithm(s) and keys).

From what is said above, the SA and RA actually perform both the roles of Sender and Receiver. The use of the prefixes of Sender (5) and Receiver (R) in the above description is just for the sake of ease of exposition. Also the sequence of doing which encryption or decryption (i.e. SRK or RRK encryption or SRK or RRK decryption) first and which second is subject to design and the sequence could be exchanged. The only requirement is the sequence of encryption and decryption should be such that the message(s) should be recovered by SA and RA intact.

The first set of SKRT, STK and SRK and the first set of RKRT, RTK and RRK could be used for the first Sender Message and the first Receiver Message or for the subsequent messages or contents in the first session or in the subsequent sessions. On the other hand, one could also send each message with its corresponding set of KRT and TK or change the KRT and TK being used only where appropriate or necessary, taking security or other factors into consideration. Wherever there is such a change, both sides should update the corresponding KRT(s) and TK(s) simultaneously for use.

In fact, the first or any subsequent Sender Message(s) and the first or any subsequent Receiver Message(s) could be just a form of KRT or TK or both KRT and TK in combination. The SA and the RA should have a corresponding handshaking protocol or message specification for differentiating different kinds or purposes of messages or contents being sent and received. How such handshaking protocol or message specification is designed is left up to the maker or the designer or those parties involved in the respective application or system that adopts the TKI of the present invention.

As there could be additional subsequent sets of KRT or TK sent or received, depending on circumstances, the first set of KRT and TK could be used for the purpose other than for deriving the RK. One may use the first TK to encrypt the first KRT and then use the second TK received to derive the first RK from the first encrypted KRT. One may think up of other scenarios for deriving the RK(s) from the TK(s) and the KRT(s), depending upon the level of security and complexity required or designed. The principle of using KRT and TK is to masquerade the RK so that messages or contents could be sent more safely and securely and not so easily cracked. Using a unique and different TK or even more a unique and different set of KRT and TK for each message sent could achieve the highest degrees of Dynamism in the sense that every message could be represented in a unique and different face. The randomness or variableness as well as the length of the KRT and the TK of course sets the parameters and scope of the uniqueness and differentiality of the message presented, i.e. the higher the degree of randomness or variableness and the greater length of the KRT and the TK used the higher the Dynamism of the message being represented.

As mentioned earlier, if the RK masqueraded in the form of TK being sent is not a variable or a random key but a unique key specific to the hardware characteristic of a Device or other identifying features, such as biometric features, one could tie the message to a specific device or person or other identity and introduce Polymorphism. And the RK and the corresponding TK could also be a variable or random key as well as a unique key specific to identifying feature(s) in combination. In this way, Dynamic Polymorphism is used with the TKI framework, making the message sent being variable or random as well as unique and specific.

MODE FOR THE INVENTION

Mode for Invention

From what is described relating to Scenario (3) above, the working of other Scenarios, i.e. (1) to (11) other than (3), could be easily deduced. For instance, if a CS is used, i.e. Scenario (4), as an agent in between the SA and the RA for passing the digital information in exchange, the Conveying Server Application (CSA) should be able to understand and use the handshaking protocol and message specification common to the SA and the RA. The CSA could use its own set of KRT and TK, i.e. CSKRT and CSTK, and process the digital messages or contents being exchanged as appropriate. However, the SA and RA are not supposed to send their sets of TK and KRT to the CSA for security reasons. In Scenario (3), the message to be sent is wrapped by the first layer of encryption according the SA's own set of TK and KRT and then by the second layer of encryption using the RA's set of TK and KRT. So if one CS is used in between the SA and the RA, the CSA during the initialization phase should pass its set of CSTK and CSKRT to both SA and RA. And after receiving the messages or contents to be exchanged later, the CSA could add its own layer of encryption with its own set of TK and KRT to the digital messages or contents to be passed along. As the SA and RA have received the CSA's set of TK and KRT, they should be able to decipher the digital messages or contents in exchange. So in Scenario (4), the SA and RA, when passing out the digital information, they should add two layers of encryption specific to SA and RA. But when they receive the digital messages or contents, the digital messages or contents have three layers of encryption; so they have to use the TK and KRT of the CSA to derive the CSRK (Conveying Server Real Key) for decryption using the corresponding algorithm used (embedded also in the SA and RA) by the CSA first before decrypting the other two layers of encryption specific to the sets of TK and KRT being used the SA and RA for those digital messages or contents.

For Scenario (5), where more than one CS are used, each of the respective CSAs initializes its own set of TK and KRT and broadcasts it to the respective SAs and RAs and upon receiving digital messages or contents to be passed along afterwards, adds to them its own layer of encryption according to its own set of TK and KRT. In the handshaking protocol and the message specification, there should be some way, such as some sort of indicator(s), for the SA and RA to know how many CSA layers of encryption have been added and how to decipher them respectively using the embedded algorithm(s).

For Scenario (1) and (2) as they are the same in the sense that one layer of encryption is used, either the SA or the RA sends out the relevant set of TK and KRT to the other side first during the initialization phase and uses this set of TK and KRT for the subsequent digital messages or contents to be exchanged. Scenarios (6) to (11) are just derivatives of the above scenarios described and need no further elaboration. In summary, all these scenarios could be represented and characterized as follows:

A Token Key Infrastructure 1, characterized by:

(1) a Token Key, which is sent over network or internet (or supplied through other ways, such as for the Ultimate Key or the first Token Key, but not precluding other Token Keys) from one side, the Sender to another side, the Receiver;

(2) a Key Reference Table, which is sent over network or internet (or supplied through other ways, such as for the first Key Reference Table, but not precluding other Key Reference Tables) from one side, the Sender to another side, the Receiver;

(3) a Real Key, which could be obtained by using the Token Key making reference to the Key Reference Table;

(4) the aforesaid Real Key being usable by the Sender for encrypting digital information to be sent over network or internet, from the Sender to the Receiver;

(5) the aforesaid Real Key being usable by the Receiver for decrypting the aforesaid digital information after its reception;

(6) the encryption or the decryption being implemented using a corresponding encryption/decryption algorithm, whether asymmetric or symmetric;

(7) the Sender or the Receiver being able to use the Token Key(s) sent or received respectively to obtain the Real Key(s) by making reference to the Key Reference Table(s);

(8) the Sender or the Receiver being able to use the Real Key(s) for encryption or decryption respectively with the use of the corresponding encryption/decryption algorithm(s), whether asymmetric or symmetric; and (9) the digital information being sent from the Sender to the Receiver over network or internet in encryption.

A Token Key Infrastructure 1 further characterized by the Real Key being a dynamic key or a polymorphic key or a dynamic polymorphic key or a Public Key under the Public Key Infrastructure or a Private Key under the Public Key Infrastructure or a key consisting of the aforesaid keys in combination.

A Token Key Infrastructure 1 further characterized by the Sender being able to assume the role of the Receiver; or the Receiver being able to assume the role of the Sender; or both the Sender and the Receiver being able to assume both the roles of the Sender and the Receiver.

A Token Key Infrastructure 1 further characterized by there being more than one Sender, or more than one Receiver or more than one Sender and one Receiver.

A Token Key Infrastructure 1 further characterized by a Conveying Server located in between the Sender and the Receiver for relaying the digital information being sent.

A Token Key Infrastructure mentioned in the preceding paragraph, i.e. Token Key infrastructure 2, further characterized by the Conveying Server being able to send its Conveying Server Token Key and Conveying Server Key Reference Table to the Receiver.

A Token Key Infrastructure 2 further characterized by the Conveying Server being able to add a layer of encryption, using the Conveying Server Real Key derivable from the Conveying Server Token Key making reference to the Conveying Server Key Reference Table, to the digital information being relayed by it from the Sender to the Receiver.

A Token Key Infrastructure 2 further characterized by the Receiver being able to decrypt the encryption layer of the digital information added by the Conveying Server using the corresponding decryption algorithm and the Conveying Server Real Key obtainable by using the Conveying Server Token Key making reference to the Conveying Server Key Reference Table received from the Conveying Server.

A Token Key Infrastructure 2 further characterized by there being more than one Sender, or more than one Receiver or more than one Sender and one Receiver.

A Token Key Infrastructure 2 further characterized by the Sender being able to assume the role of the Receiver; or the Receiver being able to assume the role of the Sender; or both the Sender and the Receiver being able to assume both the roles of the Sender and the Receiver.

A Token Key Infrastructure 1 further characterized by there being more than one Conveying Server.

A Token Key Infrastructure of the preceding paragraph, i.e. Token Key Infrastructure 3, further characterized by there being more than one Sender, or more than one Receiver or more than one Sender and one Receiver.

A Token Key Infrastructure 3 further characterized by the Sender being able to assume the role of the Receiver; or the Receiver being able to assume the role of the Sender; or both the Sender and the Receiver being able to assume both the roles of the Sender and the Receiver.

A Token Key Infrastructure 1 further characterized by there being one or more Exchange Servers, which simply exchange digital information over network or internet without performing the role of Conveying Server.

A Token Key Infrastructure 2 further characterized by there being one or more Exchange Servers, which simply exchange digital information over network or internet without performing the role of Conveying Server.

A Token Key Infrastructure 3 further characterized by there being one or more Exchange Servers, which simply exchange digital information over network or internet without performing the role of Conveying Server.

The Sender, the Receiver, the Conveying Server and the Exchange Server mentioned above refer to the users, or the applications running in the Devices performing the roles of the Sender, the Receiver, the Conveying Server and the Exchange Server described in the present invention.

Also the TKI revealed in the present invention is not limited to what is described in relation to the aforesaid Token Key infrastructure 1, Token Key infrastructure 2 and Token Key Infrastructure 3. It is just by illustration that the more essential features are described and could be further expanded to cover all the Scenarios (1) to (11) mentioned earlier. The characteristic features for each of the Scenarios (1) to (11) could be deduced by referring to the Token Key Infrastructure 1, 2 and 3 described above likewise.

There are also as many ways of deriving RK from TK by making reference to KRT as one may think up of. For instance, the TK may have a header containing indicators about how it is to be used, such as where the beginning the search for the conversion is to be begun in the KRT; for example the searching could begin from the head of KRT, such as at Offset 0; or at Offset 100, etc. etc.; and also whether the end of the KRT could be treated as wrapping back to meet with the head of the KRT if no match is found when the KRT is exhausted during that search. Of course the KRT as whole should contain all the possible codes making up the TK. So the TK could indicate that the beginning of the search should begin at Offset 100; and the match of the first code of the TK is at Position 1000 away from the Offset; the match of the second code of the TK at Position 2563, etc., etc. So if the TK have ten codes, then TK should contain the indicators of one Offset and 10 Positions. So the TK above could be represented as [100:1000, 2563 . . . ] where . . . signifies the other eight positions matching the remaining eight codes of the TK. So the RK could be obtained by looking up the codes of the KRT at the Position of 1000+100 and 2563+100 and the other eight positions from the head of the KRT. Every TK may have its unique Offset for use at different occasions or different times. As said, this is just one schema for using the TK to obtain the RK from the KRT. One may design other reference or lookup schemas to be employed by all the SAs, RAs and CSAs.

The TK of course is generated using the RK making reference also to the KRT and the KRT could contain more than one TK for the RK, i.e. there, inside the KRT, could be a many TKs to one RK relationship, but at least a one TK to one RK relationship if no more TKs are found possible. If more TKs are existent for one RK, which TK is used is subject to the referencing mechanism designed and used.

A less complicated but less secure way of implementing the TKI described earlier is not to use the KRT, but simply relying on passing over the RK, a Dynamic Key or a Polymorphic Key or a Dynamic Polymorphic Key, in encrypted form, i.e. the Encrypted Key (EK). The encryption or decryption could be done by the SA, RA and CSA using the corresponding algorithm, whether asymmetric or symmetric. In a sense, the encrypted key here could also be considered a Token Key, representing the Real Key in a way, though without using the KRT but using an encryption/decryption algorithm. Thus, the TKI using only EK, instead of using TK and KRT together, is characterized as follows:

A Token Key Infrastructure 4, characterized by:

(1) a Token Key, represented by an Encrypted Key and hereafter referred also as Token Key, which is sent over network or internet (or supplied through other ways, such as for the Ultimate Key or the first Token Key, but not precluding other Token Keys) from one side, the Sender to another side, the Receiver;

(2) a Real Key, which could be obtained by decrypting the Token Key using the corresponding decryption algorithm;

(3) the aforesaid Real Key being usable by the Sender for encrypting digital information to be sent over network or internet from the Sender to the Receiver;

(4) the aforesaid Real Key being usable by the Receiver for decrypting the aforesaid digital information after its reception;

(5) the encryption or the decryption being implemented using a corresponding encryption/decryption algorithm, whether asymmetric or symmetric;

(6) the Sender or the Receiver being able to use the Token Key(s) sent or received respectively to obtain the Real Key(s) by using the corresponding encryption/decryption algorithm;

(7) the Sender or the Receiver being able to use the Real Key(s) for encryption or decryption respectively with the use of the corresponding encryption/decryption algorithm(s), whether asymmetric or symmetric; and (8) the digital information being sent from the Sender to the Receiver over network or internet in encryption.

A Token Key Infrastructure 4 further characterized by the Real Key being a dynamic key or a polymorphic key or a dynamic polymorphic key or a Public Key under the Public Key Infrastructure or a Private Key under the Public Key Infrastructure or a key consisting of the aforesaid keys in combination.

A Token Key Infrastructure 4 further characterized by the Sender being able to assume the role of the Receiver; or the Receiver being able to assume the role of the Sender; or both the Sender and the Receiver being able to assume both the roles of the Sender and the Receiver.

A Token Key Infrastructure 4 further characterized by there being more than one Sender, or more than one Receiver or more than one Sender and one Receiver.

A Token Key Infrastructure 4 further characterized by a Conveying Server located in between the Sender and the Receiver for relaying the digital information being sent.

A Token Key Infrastructure mentioned in the preceding paragraph, i.e. Token Key Infrastructure 5, further characterized by the Conveying Server being able to send its Conveying Server Token Key to the Receiver.

A Token Key Infrastructure 5 further characterized by the Conveying Server being able to add a layer of encryption, using the Conveying Server Real Key with the corresponding encryption algorithm, to the digital information being relayed by it from the Sender to the Receiver.

A Token Key Infrastructure 5 further characterized by the Receiver being able to decrypt the encryption layer of the digital information added by the Conveying Server using the corresponding decryption algorithm and the Conveying Server Real Key, which is obtainable by decrypting the Conveying Server Token Key using the corresponding decryption algorithm.

A Token Key Infrastructure 5 further characterized by there being more than one Sender, or more than one Receiver or more than one Sender and one Receiver.

A Token Key Infrastructure 5 further characterized by the Sender being able to assume the role of the Receiver; or the Receiver being able to assume the role of the Sender; or both the Sender and the Receiver being able to assume both the roles of the Sender and the Receiver.

A Token Key Infrastructure 5 further characterized by there being more than one Conveying Server.

A Token Key Infrastructure of the preceding paragraph, i.e. Token Key Infrastructure 6, further characterized by there being more than one Sender, or more than one Receiver or more than one Sender and one Receiver.

A Token Key Infrastructure 6 further characterized by the Sender being able to assume the role of the Receiver; or the Receiver being able to assume the role of the Sender; or both the Sender and the Receiver being able to assume both the roles of the Sender and the Receiver.

A Token Key Infrastructure 4 further characterized by there being one or more Exchange Servers, which simply exchange digital information over network or internet without performing the role of Conveying Server.

A Token Key Infrastructure 5 further characterized by there being one or more Exchange Servers, which simply exchange digital information over network or internet without performing the role of Conveying Server.

A Token Key Infrastructure 6 further characterized by there being one or more Exchange Servers, which simply exchange digital information over network or internet without performing the role of Conveying Server.

Furthermore, the Ultimate Key, the first TK (including the first EK) or the first KRT are relatively more essential for the protection of the digital information that comes after. Usually it relies upon other more traditional or conventional way, such as face to face, or the use of USB Thumb Drive, voice message, etc., for separate secure delivery. However, it is quite inconvenient to do so. The present invention now also reveals a novel way, i.e. using Polymorphic Executables (PE) or its variants, Executable with Un-executable Code (EUC) or Polymorphic Executable with Un-executable Code (PEUC), or Polymorphic section with data section, for such delivery over network or internet.

To send the Ultimate Key, the first TK or the first KRT or other sensitive digital information, one could use PE or EUC or PEUC or Polymorphic section with data section. The aforesaid PCT International Application No. PCT/IB2006/053395, entitled "FROM POLYMORPHIC EXECUTABLE TO POLYMORPHIC OPERATING SYSTEM", now granted also as U.S. Pat. No. 8,583,938 B2, has already revealed how PE or its variants are generated and how such executables could be divided into general sections, polymorphic sections, and un-executable sections and how such sections could be made, generated and located. It also reveals how executable code could be put into a section that could be loaded up by PE or its variants for execution. Such sections could also be filled with digital data, such as the aforesaid Ultimate Key, the first TK or the first KRT or other sensitive digital information. And such digital information so filled in could thus be retrieved for use by the PE so designed for it as well.

So if the Sender wants to send its Ultimate Key to the Receiver, the Sender could request the Receiver to send it a PE or its variant (hereafter as Receiver Polymorphic Executable, RPE) specific to the Receiver itself. The RPE, as revealed in U.S. Pat. No. 8,583,938 B2, can only run in the Receiver Device. The RPE so sent should contain a data section that could be used to hold the Ultimate Key to be sent by the Sender. By way of illustration, upon receiving the request from the Sender, the Receiver could send the RPE for such purpose to the Sender in PKI encrypted form. After receiving the RPE, the Sender could decipher it using the corresponding PKI algorithm and private key. The Sender could then fill inside that data section of the RPE with the Ultimate Key. For better protection, before filling in the Ultimate Key, the Sender could encrypt the Ultimate Key using PKI algorithm and the public key. After filling in the encrypted Ultimate Key, the Sender could encrypt the RPE again using the corresponding PKI algorithm and public key before sending it to the Receiver. The Receiver could then decrypt it after receiving the encrypted RPE. The RPE could then be run up to extract the encrypted Ultimate Key from the data section and pass it to the RA for further decryption to obtain the Ultimate Key for use; or depending on design, the RPE could extract and decrypt the Ultimate Key before passing it to the RA for use. Other TKs, KRTs or other sensitive digital information could also be passed in the same way. The Sender, the Receiver, the Conveying Server or other parties could use the same method to send sensitive digital information over network or internet as well. This method could be integrated into the TKI as revealed in the present invention.

So this method for sending digital information over the network or internet is novel in the sense that the sensitive digital information could only be retrieved in the Receiver Device having access to the Polymorphic Key by which the RPE is made.

This method for sending digital information over network or internet is characterized by:

(1) the Receiver sends to the Sender a Polymorphic Executable or its variant (Executable with Un-executable Code or Polymorphic Executable with Un-executable Code or Polymorphic section with data section) specific to the Receiver itself;

(2) the Sender fills inside the data section within the Polymorphic Executable or its variant as mentioned in (1) with the digital information to be sent and then sends the Polymorphic Executable or its variant to the Receiver; and (3) the Receiver executes the Polymorphic Executable or its variant to obtain the digital information for use.

The aforesaid method further characterized by:

(1) the Polymorphic Executable or its variant being encrypted by the Receiver before the Receiver sends it to the Sender;

(2) the Sender decrypting the Polymorphic Executable or its variant with the corresponding algorithm and key before filling the digital information inside the data section of the Polymorphic Executable or its variant;

(3) after filling the digital information inside the data section of the Polymorphic Executable or its variant, the Sender encrypting it before sending to the Receiver; and (4) the Receiver decrypting the Polymorphic Executable or its variant after receiving for use.

The aforesaid method further characterized by:

(1) the digital information being encrypted before being filled by the Sender into the data section of the Polymorphic Executable or its variant; and (2) the digital information being decrypted for use after the Polymorphic Executable or its variant is received by the Receiver.

Each of the Token Key Infrastructure 1 to 6 mentioned above is further characterized by the use of aforesaid method in sending digital information.

INDUSTRIAL APPLICABILITY

The TKI and the way Dynamism, Polymorphism, Dynamic Polymorphism and PKI are integrated with it for exchange of digital information over network or internet has tremendous application, such as using it in all sorts of programs for exchange of digital information, including social communication platforms or programs like online messengers, WeChat, Skype, WhatApps, Facebook, routers, gateways, http servers, etc. etc. Messages or contents to be stored on the storage servers for those platforms or programs could be stored and passed along in encrypted form over network or internet; the client programs, such as Polymorphic Executable Clients, could decipher those encrypted digital messages or contents, whether as dynamic or dynamic and polymorphic forms, only after receiving them. In addition, as mentioned before, a new sales model of provision of digital services, such as delivery of digital data and digital executable codes could be implemented using the TKI as described in the present invention. The use of Polymorphic Executables or its variants under the TKI could further protect the digital information being delivered. That is the SA, RA, CSA and other client applications could be in the form of Polymorphic Executable or it variants.

So the Token Key Infrastructure as presented in the description of this invention could be summarized as follows:

A Token Key Infrastructure, characterized by:

(1) a Token Key, which is sent in digital form over network or internet from one side, the Sender to another side, the Receiver;

(2) a Key Reference Table or Information necessary for generating a Key Reference Table, which is sent in digital form over network or internet from one side, the Sender to another side, the Receiver where the Key Reference Table or the Information necessary for generating a Key Reference Table is not already kept by the Sender or the Receiver; and (3) a Real Key, which could be obtained by using the Token Key making reference to the Key Reference Table and which is used for encrypting digital information to be exchanged over network or internet.

A Token Key Infrastructure, characterized by:

(1) a Token Key, which is sent in digital form over network or internet from one side, the Sender to another side, the Receiver;

(2) a Key Reference Table or Information necessary for generating a Key Reference Table, which is sent in digital form over network or internet from one side, the Sender to another side, the Receiver where the Key Reference Table or the Information necessary for generating a Key Reference Table is not already kept by the Sender or the Receiver;

(3) a Real Key, which could be obtained by using the Token Key making reference to the Key Reference Table;

(4) the aforesaid Real Key being usable by the Sender for encrypting digital information to be sent over network or internet from the Sender to the Receiver:

(5) the aforesaid Real Key being usable by the Receiver for decrypting the aforesaid digital information after its reception;

(6) the encryption or the decryption being implemented using a corresponding encryption/decryption algorithm, whether asymmetric or symmetric;

(7) the Sender or the Receiver being able to use the Token Key(s) sent or received respectively to obtain the Real Key(s) by making reference to the Key Reference Table(s);

(8) the Sender or the Receiver being able to use the Real Keys) for encryption or decryption respectively with the use of the corresponding encryption/decryption algorithm(s), whether asymmetric or symmetric; and (9) the aforesaid digital information being sent from the Sender to the Receiver over network or internet in encryption.

Token Key Infrastructure of the preceding paragraph further characterized by the Real Key being a dynamic key or a polymorphic key or a dynamic polymorphic key or a Public Key under the Public Key Infrastructure or a Private Key under the Public Key Infrastructure or a key consisting of the aforesaid keys in combination.

A Token Key Infrastructure of above further characterized by the Sender being able to assume the role of the Receiver; or the Receiver being able to assume the role of the Sender; or both the Sender and the Receiver being able to assume both the roles of the Sender and the Receiver.

A Token Key Infrastructure of above further characterized by there being more than one Sender, or more than one Receiver or more than one Sender and one Receiver.

A Token Key Infrastructure of above further characterized by a Conveying Server located in between the Sender and the Receiver for relaying the digital information being sent.

A Token Key Infrastructure of above further characterized by the Conveying Server being able to send to the Receiver its Conveying Server Token Key and Conveying Server Key Reference Table or information necessary for generating Conveying Server Key Reference Table.

A Token Key Infrastructure of above further characterized by the Conveying Server being able to add a layer of encryption, using the Conveying Server Real Key derivable from the Conveying Server Token Key making reference to the Conveying Server Key Reference Table, to the digital information being relayed by it from the Sender to the Receiver.

A Token Key Infrastructure of above further characterized by the Receiver being able to decrypt the encryption layer of the digital information added by the Conveying Server using the corresponding decryption algorithm and the Conveying Server Real Key obtainable by using the Conveying Server Token Key making reference to the Conveying Server Key Reference Table received from the Conveying Server or generated from the Information sent for making the Conveying Server Key Reference Table.

A Token Key Infrastructure of above further characterized by the Sender being able to assume the role of the Receiver; or the Receiver being able to assume the role of the Sender; or both the Sender and the Receiver being able to assume both the roles of the Sender and the Receiver.

A Token Key Infrastructure of above further characterized by there being more than one Conveying Server.

A Token Key Infrastructure of above further characterized by the Sender being able to assume the role of the Receiver; or the Receiver being able to assume the role of the Sender; or both the Sender and the Receiver being able to assume both the roles of the Sender and the Receiver.

A Token Key Infrastructure of above further characterized by there being one or more Exchange Servers, which simply exchange digital information over network or internet without performing the role of Conveying Server.

A Token Key Infrastructure, characterized by:

(1) a Token Key, represented by an Encrypted Key and hereafter referred also as Token Key, which is sent over network or internet from one side, the Sender to another side, the Receiver;

(2) a Real Key, which could be obtained by decrypting the Token Key using the corresponding decryption algorithm;

(3) the aforesaid Real Key being usable by the Sender for encrypting digital information to be sent over network or internet, from the Sender to the Receiver;

(4) the aforesaid Real Key being usable by the Receiver for decrypting the aforesaid digital information after its reception;

(5) the encryption or the decryption being implemented using a corresponding encryption/decryption algorithm, whether asymmetric or symmetric;

(6) the Sender or the Receiver being able to use the Token Key(s) sent or received respectively to obtain the Real Key(s) by using the corresponding encryption/decryption algorithm;

(7) the Sender or the Receiver being able to use the Real Key(s) for encryption or decryption respectively with the use of the corresponding encryption/decryption algorithm(s), whether asymmetric or symmetric; and (8) the digital information being sent from the Sender to the Receiver over network or internet in encryption.

A Token Key Infrastructure of above further characterized by the Real Key being a dynamic key or a polymorphic key or a dynamic polymorphic key or a Public Key under the Public Key Infrastructure or a Private Key under the Public Key Infrastructure or a key consisting of the aforesaid keys in combination.

A Token Key Infrastructure of above further characterized by the Sender being able to assume the role of the Receiver; or the Receiver being able to assume the role of the Sender; or both the Sender and the Receiver being able to assume both the roles of the Sender and the Receiver.

A Token Key Infrastructure of above further characterized by a Conveying Server located in between the Sender and the Receiver for relaying the digital information being sent.

A Token Key Infrastructure of above further characterized by the Conveying Server being able to send its Conveying Server Token Key to the Receiver.

A Token Key Infrastructure of above further characterized by the Conveying Server being able to add a layer of encryption, using the Conveying Server Real Key with the corresponding encryption algorithm, to the digital information being relayed by it from the Sender to the Receiver.

A Token Key Infrastructure of above further characterized by the Receiver being able to decrypt the encryption layer of the digital information added by the Conveying Server using the corresponding decryption algorithm and the Conveying Server Real Key, which is obtainable by decrypting the Conveying Server Token Key using the corresponding decryption algorithm.

A Token Key Infrastructure of above further characterized by there being more than one Conveying Server.

A Token Key Infrastructure of above further characterized by there being more than one Sender, or more than one Receiver or more than one Sender and one Receiver.

A Token Key Infrastructure of above further characterized by the Sender being able to assume the role of the Receiver; or the Receiver being able to assume the role of the Sender; or both the Sender and the Receiver being able to assume both the roles of the Sender and the Receiver.

A Token Key Infrastructure of above further characterized by there being one or more Exchange Servers, which simply exchange digital information over network or internet without performing the role of Conveying Server.

A method for sending digital information over network or internet, characterized by:

(1) the Receiver sends to the Sender a Polymorphic Executable or its variant (Executable with Un-executable Code or Polymorphic Executable with Un-executable Code or Polymorphic section with data section) specific to the Receiver itself;

(2) the Sender fills inside the data section within the Polymorphic Executable or its variant as mentioned in (1) above with the digital information to be sent and then sends the Polymorphic Executable or its variant to the Receiver; and (3) the Receiver executes the Polymorphic Executable or its variant to obtain the digital information for use.

The method of above further characterized by:

(1) the Polymorphic Executable or its variant being encrypted by the Receiver before the Receiver sends it to the Sender;

(2) the Sender decrypting the Polymorphic Executable or its variant with the corresponding algorithm and key before filling the digital information inside the data section of the Polymorphic Executable or its variant;

(3) after filling the digital information inside the data section of the Polymorphic Executable or its variant, the Sender encrypting it before sending to the Receiver; and (4) the Receiver decrypting the Polymorphic Executable or its variant after receiving for use.

The method of above further characterized by:

(1) the digital information being encrypted by the Sender before being filled by the Sender into the data section of the Polymorphic Executable or its valiant; and (2) the digital information being decrypted for use after the Polymorphic Executable or its variant is received by the Receiver.

A Token Key Infrastructure of above further characterized by the use of the method above in sending digital information.

A Token Key Infrastructure of above further characterized by the use of Polymorphic Executable or its variants.

The above describes a characteristic of the Token Key Infrastructure being a Key Reference Table or Information necessary for generating a Key Reference Table, which is sent in digital form over network or internet from one side, the Sender to another side, the Receiver where the Key Reference Table or the Information necessary for generating a Key Reference Table is not already kept by the Sender or the Receiver. In all the aforesaid description about the sending of Key Reference Table (KRT), whether of Sender (SKRT), of Receiver (RKRT) or of Conveyor (CKRT), it is mentioned that either the KRT is sent over the network or internet or imported into the Sender Application, the Receiver Application or the Conveyor Server Application through other means. It also suggests that the KRT could be generated by the SA, RA or CSA or retrieved from some generating servers for making KRT for the purpose. It is also said that given a particular RT, there should be at least one TK or could be many TKs found in the KRT, i.e. either one to one relationship or one to many relationship. Also if the Key Reference Table or the Information necessary for generating a Key Reference Table is not already kept by the Sender or the Receiver, so either Key Reference Table or the information necessary for generating a Key Reference Table have to be sent to the Sender Application or the Receiver Application for use. If the SA or the RA has no KRT, they either have to receive it or generate it. They either have some built-in information for generating the KRT or have such Information sent to them or retrieved from somewhere else.

By way of illustration hereby, a KRT with one-one mapping between RK and TK could be generated, using java language, as follows:

```
int[ ] generateReferenceTable(int key[ ], int blocksize) {
    // Allocate memory for the reference table
    int[ ] result = new int[blocksize];
    // Initialize the reference table
    for (int i = 0; i < result.length; i++) {
        result[i] = -1;
    }
    // p is the current index of key
    int p = 0;
    for (int i = 0; i < result.length; i++) {
        // when p is larger than the length of key, reset the index to 0
        if (p >= key.length)
            p = 0;
        p++;
        // The position of element i in the reference table
        int r = key[p] % (result.length - i);
        // Find position r in the reference table, skipping items that are already filled
        for (int j = 0; j < result.length; j++) {
            if (result[j] == -1) {
                if (r == 0) {
                    result[j] = i;
                    break;
                }
                r--;
            }
        }
    }
    return result;
}
```

The SA or RA or CSA could randomly select a key and preset a blocksize and pass these two parameters into the above function for generating a KRT returned in the result. For instance, for an ASCII Table, the blocksize is 256 and a UniCode Table 65536 and the size of the key could 256! and 65536! respectively. The key size however could not of course be indefinitely long, and a key of sufficient length for the level of security required in the application is good enough for use. Irregular blocksizes could be used as well, depending on the design and requirement. And the key and the blocksize parameters, in this case the Information necessary for generating the KRT (IKRT), could be passed between SA or RA or CSA for their common use. The SA or RA or CSA could also pass the KRT thus generated amongst them without passing the IKRT instead. For making a KRT with one-many mapping between RK and TK, 2 or more different KRTs could be merged into one for use.

The prior art for the implementation of this invention includes encryption/decryption algorithms and the knowledge of using such algorithms; reference tables or lookup tables and the methods of making reference or lookup; computer languages and compilers for making executable code and operating systems as well as the related knowledge for making application or programs; the hardware of any device(s), whether networked or standalone, including computer system(s) or computer-controlled device(s) or operating-system-controlled device(s) or system(s), capable of running executable code; and computer-executable or operating-system-executable instructions or programs that help perform the steps for the method of this invention. In combination with the use of the technical features contained in the prior art stated above, this invention makes possible the implementation of a Token Key Infrastructure for the exchange of digital information, including digital data and digital executable codes, over network or internet in a secure way with the use of Dynamism, Polymorphism and Dynamic Polymorphism, as well as integrating with Public Key Infrastructure where considered appropriate for the protection of intellectual property rights, privacy and confidentiality of digital information; and in this relation, is characterized by the following claims:

The invention claimed is:

1. A Token Key Infrastructure system, comprising:
a sending computing device configured to send a message, in a digital form over network or internet, to a receiving computing device, wherein the message comprises a Token Key and a Key Reference Table or Information necessary for generating the Key Reference Table, which are collectively encrypted using an Ultimate Key; and
the receiving computing device configured to collectively decrypt, based on the Ultimate Key, the Token Key and the Key Reference Table or Information necessary for generating the Key Reference Table and derive a Real Key using the Token Key making reference to the Key Reference Table, wherein the receiving device is configured to decrypt, based on the Real Key, encrypted digital information exchanged over the network or internet.

2. The Token Key Infrastructure system of claim 1, wherein the receiving computing device is configured to encrypt digital information to be sent to the sending computing device based on a Real Key specific to the receiving computing device to produce an encrypted set of digital information.

3. Token Key Infrastructure system, comprising:
a sending computing device configured to send a message, in a digital form over network or internet, to a receiving computing device, wherein the message comprises a Token Key and
a Key Reference Table or Information necessary for generating the Key Reference Table, which are collectively encrypted using an Ultimate Key, wherein the sending computing device is configured to encrypt, based on a Real Key and an asymmetric or symmetric encryption/decryption algorithm, digital information to be sent over the network or internet to the receiving computing device; and
the receiving computing device configured to collectively decrypt, based on the Ultimate Key, the Token Key and the Key Reference Table or Information necessary for generating the Key Reference Table and derive the Real Key using the Token Key making reference to the Key Reference Table, wherein the receiving computing device is configured to decrypt, based on the Real Key and the asymmetric or symmetric encryption/decryption algorithm, encrypted digital information received from the first computing device.

4. Token Key Infrastructure system of claim 3, wherein the Real Key is a dynamic key or a polymorphic key or a dynamic polymorphic key or a Public Key under the Public Key Infrastructure or a Private Key under the Public Key Infrastructure or a key consisting of the aforesaid keys in combination.

5. A Token Key Infrastructure system of claim 3, wherein a Conveying Server is located in between the sending computing device and the receiving computing device for relaying the digital information being sent.

6. A Token Key Infrastructure system of claim 5, wherein the Conveying Server is configured to send to the receiving computing device its Conveying Server Token Key and Conveying Server Key Reference Table or Information necessary for generating Conveying Server Key Reference Table.

7. A Token Key Infrastructure system of claim 5, wherein the Conveying Server is configured to add a layer of encryption, using the Conveying Server Real Key derivable from the Conveying Server Token Key making reference to the Conveying Server Key Reference Table, to the digital information being relayed by it from the sending computing device to the receiving computing device.

8. A Token Key Infrastructure system of claim 5, wherein the receiving computing device is configured to decrypt an encryption layer of the digital information added by the Conveying Server using the corresponding decryption algorithm and the Conveying Server Real Key obtainable by using the Conveying Server Token Key making reference to the Conveying Server Key Reference Table received from the Conveying Server or generated from the Information sent for making the Conveying Server Key Reference Table.

9. Token Key Infrastructure system of claim 5, further comprising one or more Exchange Servers, which simply exchange digital information over network or internet without performing the role of Conveying Server.

10. A Token Key Infrastructure system of claim 5, further comprising the use of Polymorphic Executable or its variants.

11. A Token Key Infrastructure system of claim 3, wherein there are more than one Conveying Server.

12. A Token Key Infrastructure system of claim 11, further comprising one or more Exchange Servers, which simply exchange digital information over network or internet without performing the role of Conveying Server.

13. A Token Key Infrastructure system of claim 11, further comprising the use of Polymorphic Executable or its variants.

14. A Token Key Infrastructure system of claim 3, further comprising one or more Exchange Servers, which simply exchange digital information over network or internet without performing the role of Conveying Server.

15. A Token Key Infrastructure system of claim 3, further comprising the use of Polymorphic Executable or its variants.

16. The Token Key Infrastructure system of claim 3, wherein the receiving computing device is configured to encrypt digital information to be sent to the sending computing device based on a Real Key specific to the receiving computing device to produce an encrypted set of digital information.

* * * * *